UNITED STATES PATENT OFFICE.

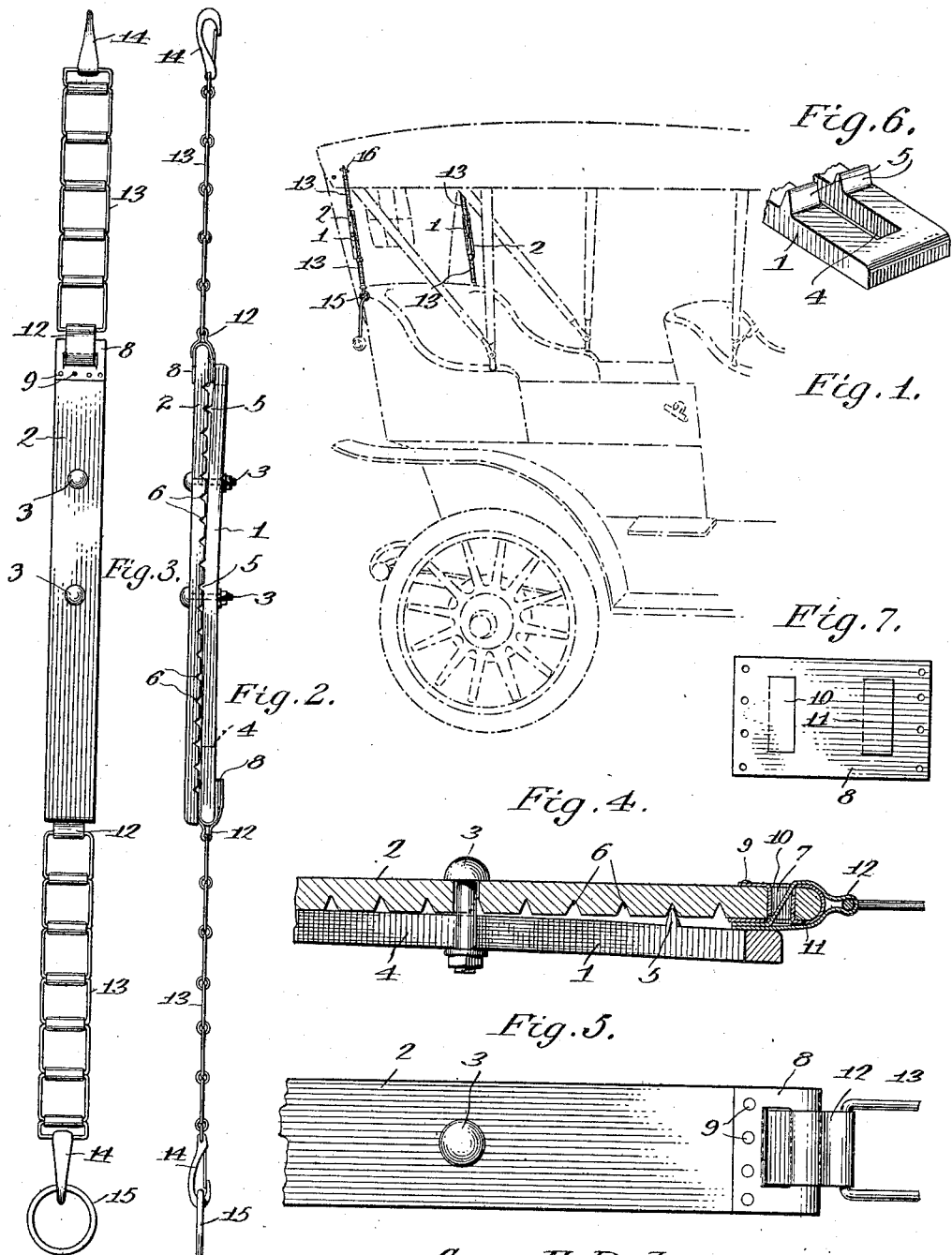

GEORGE E. ROBINSON, OF MEDFORD, OREGON.

AUTOMOBILE STAY-STRAP.

1,030,539.     Specification of Letters Patent.     Patented June 25, 1912.

Application filed April 27, 1911. Serial No. 623,705.

*To all whom it may concern:*

Be it known that I, GEORGE E. ROBINSON, a citizen of the United States, residing at Medford, in the county of Jackson and State of Oregon, have invented certain new and useful Improvements in Automobile Stay-Straps, of which the following is a specification, reference being had therein to the accompanying drawing.

This invention relates to stays which are used to brace the cover of an automobile and the principal object of the same is to so construct the stay that it can be adjusted and the tension placed upon the cover thus be regulated.

This invention is illustrated in the accompanying drawings, wherein:—

Figure 1 is a view showing the improved stays in position, the automobile being indicated by dotted lines. Fig. 2 is an edge view of the improved stay. Fig. 3 is a plan view of the stay. Fig. 4 is an enlarged fragmentary view of the stay, one of the bars being shown in section. Fig. 5 is an enlarged view of one end portion of the bar shown in Fig. 3. Fig. 6 is a fragmentary view of one of the bars looking at the end face. Fig. 7 is a view of the blank from which the protecting plate is formed.

This invention comprises a pair of bars 1 and 2, which are adjustably held together by means of the bolts 3. The bar 1 is provided with a longitudinally extending slot 4 and with the transverse ribs 5. The bar 2 is provided with a plurality of transverse grooves 6 in which the ribs 5 fit so that the bars will be prevented from slipping after the bolts 3 have been tightened. One end of each of the bars is provided with an opening 7. A protecting plate 8 is bent around the end of the bar and is secured in place by means of the nails 9. Tongues 10 and 11 are struck from the plate and bent into the opening to cover the inner portion of the opening. The clip 12 has one end passed through the opening 7 and has the other end placed upon the first mentioned end and secured in place by means of nails or other suitable securing means. A chain 13 is mounted upon each of the clips 12 and has a snap hook 14 at the free end. It should be noted that the ribs 5 are of such length that when the plates are in a locked position they will be slightly bowed as shown in Figs. 2 and 4, so that they will have a tendency to spring apart and thus keep the bolts from becoming loose.

In using this device the snap hook at one end engages a ring 15 which is placed upon the rear portion of the automobile and the snap hook at the other end engages a screw eye 16, which is secured in the top of the machine. The bars are then adjusted so as to give the required tension, and the bolts 3 are tightened so that the bars will be held in the adjusted position.

What I claim is:—

A device of the character described comprising a plurality of bars, each of said bars having an opening near one end, a reinforcing plate mounted upon the end of each bar, independent securing means for said plate, tongues extending from said plate through said opening to hold said plate in engagement with said bar independently of said securing means, a link mounted upon the reinforced end of said bar and having one end portion passed through said opening and engaging said tongues to hold said tongues in engagement with the walls of said opening, the ends of said link holding said bars in spaced relation, and means for securing said bars together.

In testimony whereof I hereunto affix my signature in presence of two witnesses.

GEORGE E. ROBINSON.

Witnesses:
CARL FICHTNER,
FRANK W. BARTLETT.

Copies of this patent may be obtained for five cents each, by addressing the "Commissioner of Patents, Washington, D. C."